July 27, 1965  W. P. SCHMITTER  3,196,635
COUPLING
Filed Jan. 7, 1963  2 Sheets-Sheet 1
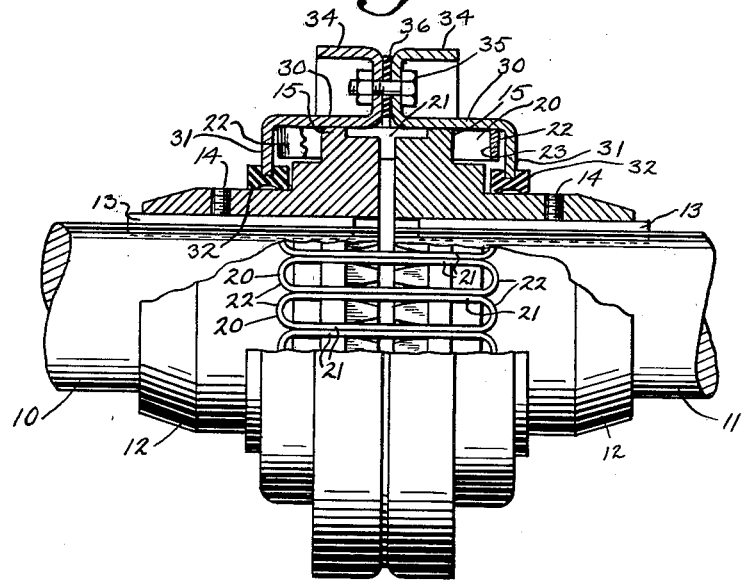
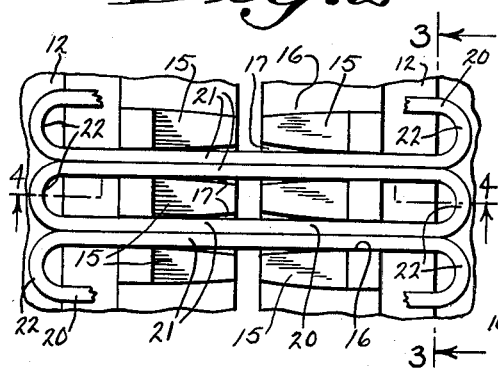
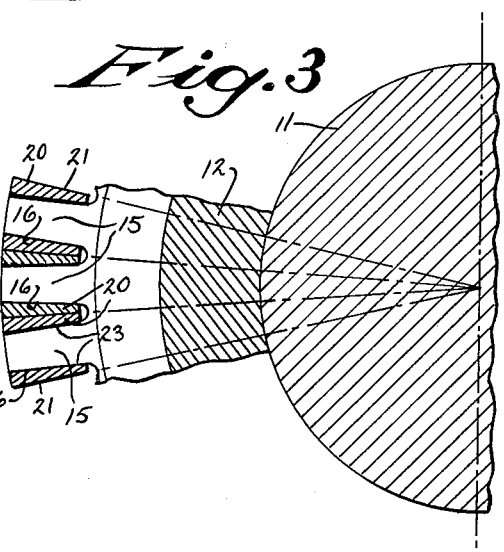
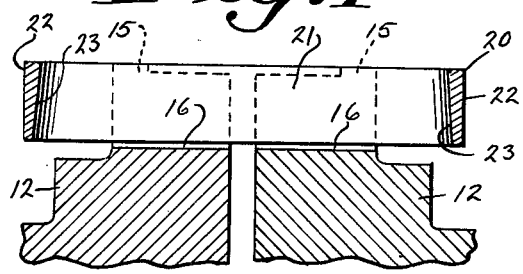
INVENTOR
WALTER P. SCHMITTER, DECEASED
BY A. LOUISE SCHMITTER
ROBERT V. ABENDROTH,
CO-EXECUTORS
BY Adrian L. Bateman
ATTORNEY July 27, 1965 W. P. SCHMITTER 3,196,635
COUPLING
Filed Jan. 7, 1963 2 Sheets-Sheet 2
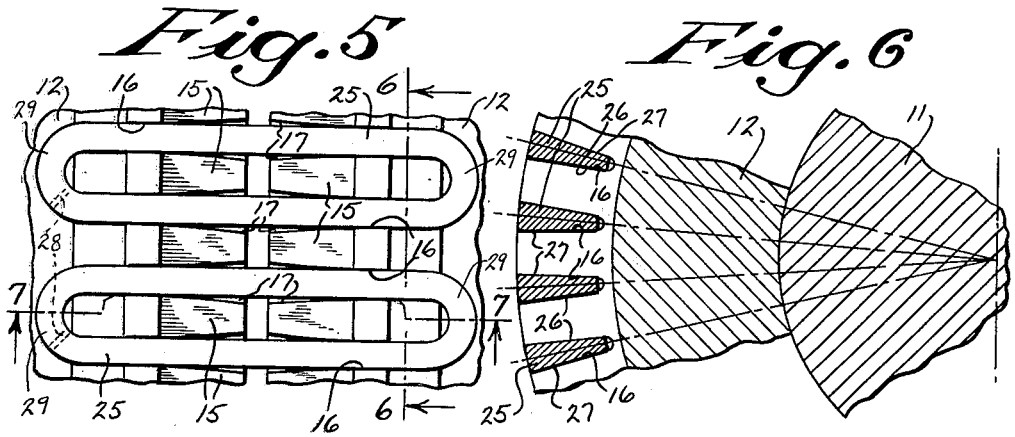
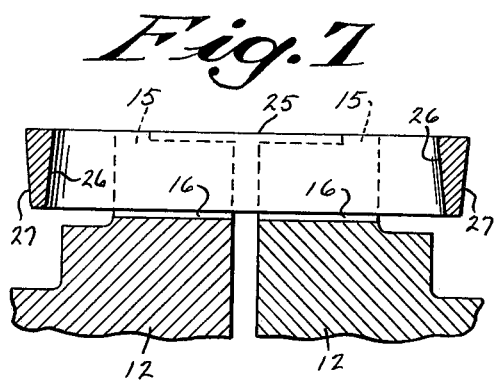
INVENTOR
WALTER P. SCHMITTER, DECEASED
BY A. LOUISE SCHMITTER
ROBERT V. ABENDROTH,
CO-EXECUTORS
BY
ATTORNEY

United States Patent Office 3,196,635
Patented July 27, 1965

3,196,635
COUPLING
Walter P. Schmitter, deceased, late of Wauwatosa, Wis., by A. Louise Schmitter, Wauwatosa, Wis., and Robert V. Abendroth, Whitefish Bay, Wis., co-executors, assignors to The Falk Corporation, Milwaukee, Wis., a corporation of Wisconsin
Filed Jan. 7, 1963, Ser. No. 249,947
9 Claims. (Cl. 64—15)

The present invention relates to couplings and, in particular, to flexible shaft couplings in which the coupled members are formed with axially directed peripheral grooves and are operatively connected together in driving relation by means of resilient interconnecting members fitting in and drivingly connecting said grooves of both coupling members. Specifically, this invention is directed to improvements in the resilient interconnecting members, commonly known to the trade as "grids," and in which the improved grids may take the form of a plurality of continuous loop spring-like members arranged to surround adjacent radially projecting teeth defining the said peripheral grooves of oppositely disposed coupling members, and in which the grid members may be disposed within a respective groove in back-to-back relationship with a complementary continuous loop spring-like grid member, to provide a resilient laminae construction; or the invention may take another form to provide a continuous loop spring of a thickness substantially filling the said peripheral grooves and thereby totally surrounding alternately arranged teeth of the coupling members.

It is, therefore, an object of the present invention to provide an improved grid member for a flexible coupling in the form of a continuous loop which permits ease in assembly and simplicity of manufacture and which grid permits greater misalignment capacity of the opposed coupling members than grids heretofore suggested.

It is a further object of the present invention to provide a grid element of a continuous loop configuration and which element may be placed in back-to-back relationship with a complementary element within the slots or grooves defined by the respective teeth of conventional flexible coupling members.

It is still another object of the present invention to provide a grid of closed loop configuration having at least one tapered side to obtain the inherent advantages of such a grid cross section when said taper substantially matches the taper of the slot surface formed by adjacent teeth of matching coupling members and when disposed with a grid of complementary cross section in the slots defined by adjacent teeth.

The invention further consists in the several features hereinafter set forth and more particularly defined by claims at the conclusion hereof.

In the drawings:

FIG. 1 is an elevation view with parts broken away and parts shown in section of a coupling embodying one form of the invention, and with the coupling in a non-loaded condition;

FIG. 2 is an enlarged fragmentary view of a portion of the coupling of FIG. 1, specifically illustrating one embodiment of the grid members of the present invention;

FIGS. 3 and 4 are sectional views of one of the coupling members taken along lines 3—3 and 4—4 of FIG. 2, respectively;

FIG. 5 is an enlarged fragmentary view of a portion of the coupling of FIG. 1, illustrating another embodiment of the present invention; and FIGS. 6 and 7 are sectional views of one of the coupling members taken along lines 6—6 and 7—7 of FIG. 5, respectively.

Referring to the drawings in each instance, numerals 10 and 11 designate substantially axially aligned shafts, either one of which may be the driver and the other the driven, and 12 a coupling member or hub for each shaft secured to be driven thereby by a key 13 locked against endwise movement by means of a set screw 14.

Each coupling member 12 is provided with a plurality of circumferentially spaced teeth 15 forming axially directed grooves 16 which converge or taper inwardly at 17 toward the inner faces of each of the coupling hubs. The grooves 16 are equally spaced and adjacent grooves of the opposed coupling members 12 are substantially axially aligned with each other in the normal or unloaded condition of the structure, as shown in FIG. 1.

Referring to the embodiment of FIGS. 1-4, inclusive, the opposed coupling members 12 are operatively connected together by means of a plurality of connecting members 20, commonly known as "grids" and in the form of conttinuous or closed loop elements. These elements are preferably made from spring metal stock in accordance with the method to be later described, and include straight leg portions 21 and linking end loops 22. It will be observed from FIG. 4 that each of the grid elements 20 is preferably provided, at its inner surface, with a downwardly extending taper 23 to conform with the taper of the slots or grooves 16 (see FIG. 3), in accordance with the teachings of the copending application of the present inventor for Coupling bearing Serial No. 105,529, filed on April 20, 1961, now U.S. Patent No. 3,079,773, and assigned to the present assignee.

With reference to FIG. 2, it will be observed that the embodiment therein illustrated provides the grid elements 20 in complementary back-to-back arrangement seated in the grooves 16. This embodiment, therefore, provides complementary pairs of grid elements, each grid element being a continuous, closed loop surrounding and drivingly connecting pairs of adjacent teeth 15 of the respective coupling hub members.

In the aforementioned copending application, grid elements in the form of a segmented continuous member shaped with reverse bends in serpentine fashion are disclosed. It has been found that complementary continuous loop coupling elements of the type utilized in FIGS. 1–4, for the same width of slot used in a serpentine grid, will have less torque transmitting capacity, but substantially greater resiliency than the aforementioned serpentine grids. If, however, the individual grid sections of the complementary loop spring grid elements 20 are made thicker than the thickness of a corresponding serpentine grid, torque transmitting capacity can be made equal to the capacity of a serpentine grid while retaining a substantially greater resilience. In such case, it will be apparent that the slot or the grooves 16 may be made deeper than the corresponding grooves in a coupling having serpentine grids due to the greater ease of assembly provided by the individual grid elements of this invention. In addition, due to the aforementioned greater resilience, the taper of the teeth of the hubs and the corresponding taper of the grid elements may be increased over that which would normally be used in a serpentine shaped, continuous grid as disclosed in the aforesaid U.S. Patent No. 3,079,773. Capacity may be built into the coupling of the present invention to provide a value equal to the serpentine grid and the complementary arrangement of the adjacent continuous loop spring grid elements will still provide substantially greater resilience. The improved resilience of the complementary loop grids of FIGS. 1-4 is attributable in large part to interlocking interaction at the interfaces of adjoining grid loops. As the coupling is loaded in use this interface interlocking of the complementary loops produces a transmission of sheer forces across the interfaces with the result that the entire grid loop becomes stressed, including the end loops 22.

One of the more important features of the present invention lies in the fact that the grid elements 20 may pivot about the teeth 15 on hubs 12, so that the hubs may be secured to misaligned shafts without exerting elastic strain upon the grids. That is, the hubs may have radial free play if tooth clearance is provided.

Referring now to FIGS. 5, 6 and 7, there is illustrated therein another embodiment of the invention wherein the grid elements are individually disposed in the grooves 16, rather than in complementary arrangement. Throughout the present discussion, it will be noted that the same parts are identified by like reference numerals.

In the present embodiment, the continuous loop grid elements 25 are arranged to individually surround alternate teeth 15 of the respective coupling members 12. It will be apparent from FIGS. 6 and 7, that, in this case, the grid elements 25 are provided with opposed tapered surfaces 26 and 27, respectively, which surfaces are arranged to engage complementary tapered surfaces of the grooves 16 as shown in FIG. 6.

It has been found that the curved end portions 29 of the single loop grids of this embodiment are not stressed, in contrast with the complementary loop grids of the first described embodiment. Thus, the side legs of the grid carry the entire stress and may, therefore, be regarded as single stress carrying bars or rods. Because of this fact, the loops of this embodiment may be left open in a portion of one of the end loops, as by removing the section of material 28 lying between the dotted lines in FIG. 5.

The single loop design of the present embodiment will provide a more flexible coupling than the aforementioned serpentine type grid, provided the flared portions 17 of teeth 16 are arranged to provide a ratio of supported span of each grid leg to total span of each grid leg greater than 0.75. It should be noted, therefore, that the provision of a substantial unsupported span in each grid leg is important in the present embodiment, and this is preferably accomplished by providing a substantially equal amount of flare in each tooth of each coupling member 12. To insure the maintenance of a long unsupported span in each grid leg, it will be found desirable to force each grid leg to seat securely in its slot by a wedging action provided by the coupling cover (see FIG. 1).

In both of the described embodiments, the respective grid elements 20 and 25 are enclosed in a housing (see FIG. 1) formed of complementary flanged cylindrical members 30 whose flanges 31 carry rubber rings 32 which fit the cylindrical surface of each coupling member 12. The members 30 further include flanges 34 secured together by a series of radially disposed bolt and nut assemblies 35 with a rubber sealing ring 36 disposed between them. The housing is preferably packed with grease or other suitable lubricant.

For purposes of disclosure, the foregoing embodiments have been described as illustrative of the invention. Other embodiments and variations will be apparent to those skilled in the art and, hence, it is intended that the scope of the invention be that defined in the claims and not that set forth in the detailed description of the several embodiments.

What is claimed is:

1. In a flexible coupling including a pair of axially disposed coupling members each having peripherally spaced teeth defining axially directed peripheral grooves therebetween, the grooves and teeth of one coupling member normally aligning with those of the other coupling member; the combination therewith of a plurality of continuous closed loop spring grid elements operatively connecting said coupling members with adjacent pairs of said grid elements having adjacent leg portions thereof disposed in abutting complementary relation in respective grooves of said coupling members, each of said grid elements surrounding a respective pair of the aligned teeth of said coupling members.

2. In a flexible coupling including a pair of axially disposed coupling members each having peripherally spaced teeth including opposed sides defining axially directed peripheral grooves therebetween, the grooves and teeth of one coupling member normally aligning with those of the other coupling member and the inner face of each coupling member being in facing relationship with the other; the combination therewith of a plurality of continuous closed loop spring grid elements operatively connecting said coupling members together and having intermediate leg portions thereof disposed in said grooves, said grid elements each surrounding an alternate pair of the aligned teeth of said coupling members and having end loop portions extending beyond the said teeth, each tooth of each coupling member being flared outwardly from the inner face of the hub to provide a substantial non-supported span for each leg portion of each loop spring grid element, said sides of each tooth of said coupling members being tapered to provide tapered grid receiving grooves, and said grid elements having tapered sides substantially mating with the taper of the grid receiving grooves.

3. A flexible coupling comprising; a pair of axially disposed coupling members each including peripherally spaced teeth having opposed inwardly diverging surfaces defining axially directed peripheral tapered grooves therebetween, the grooves and teeth of one coupling member normally aligning with those of the other coupling member; a plurality of continuous closed loop spring grid elements operatively connecting said coupling members, each grid element having intermediate leg portions of tapered cross-section disposed in said tapered grooves and connecting end loops extending beyond the grooves of the respective coupling members.

4. A flexible coupling comprising; a pair of axially disposed coupling members each having peripherally spaced teeth including opposed inwardly diverging surfaces defining axially directed peripheral tapered grooves therebetween, the grooves and teeth of one coupling member normally aligning with those of the other coupling member; a plurality of continuous closed loop spring grid elements each having one tapered side substantially conforming to the taper of said groove operatively connecting said coupling members, the intermediate leg portions of adjacent grid elements being disposed in complementary relationship in each groove.

5. A flexible coupling comprising a pair of axially disposed coupling members each having peripherally spaced teeth including opposed inwardly diverging surfaces defining axially directed peripheral tapered grooves therebetween, the grooves and teeth of one coupling member normally aligning with those of the other coupling member; a plurality of spring grid elements operatively connecting said coupling members, each grid element having a pair of intermediate leg portions with tapered sides disposed in said grooves and one end loop extending beyond the teeth and connecting said intermediate leg portions.

6. As a new article of manufacture, a spring grid element adapted for operatively connecting opposed flexible coupling members, said grid element comprising a continuous closed loop member of resilient material having spaced, relatively flat, parallel, intermediate leg portions and transverse connecting end loops joining each of said leg portions, said intermediate leg portions having their opposed innermost sides tapered angularly relative to the outer sides.

7. As a new article of manufacture, a spring grid element adapted for operatively connecting opposed flexible coupling members, said grid element comprising a continuous closed loop member of resilient material having spaced, relatively flat, parallel, intermediate leg portions including at least one tapered side, and transverse connecting end loops joining each of said leg portions.

8. As a new article of manufacture, a spring grid element adapted for operatively connecting opposed flexible coupling members, said grid element comprising a continuous closed loop member of resilient material having spaced, relatively flat, parallel, intermediate leg portions and transverse connecting end loops joining each of said leg portions, each of said intermediate leg portions having its opposite side surfaces angularly tapered.

9. As a new article of manufacture, a spring grid element adapted for operatively connecting opposed flexible coupling members, said grid element comprising a loop member of resilient material having spaced, relatively flat, parallel, intermediate leg portions and one transverse connecting end loop joining said leg portions, each of said intermediate leg portions having its opposite side surfaces angularly tapered.

References Cited by the Examiner

UNITED STATES PATENTS

| 1,316,903 | 9/19 | Kuentzel | 64—12 |
| 1,328,509 | 1/20 | Ganster | 29—417 |
| 1,908,072 | 5/33 | Spang | 29—417 |
| 2,555,909 | 6/51 | Wellauer. | |
| 3,079,773 | 3/63 | Schmitter. | |

FOREIGN PATENTS 344,139   3/31   Great Britain.

ROBERT C. RIORDON, *Primary Examiner.*

FRANK SUSKO, *Examiner.*